(12) United States Patent
Thrush et al.

(10) Patent No.: US 10,634,614 B2
(45) Date of Patent: Apr. 28, 2020

(54) HIGH POWERED LASERS FOR WESTERN BLOTTING

(71) Applicant: Bio-Rad Laboratories, Inc., Hercules, CA (US)

(72) Inventors: Evan Thrush, San Anselmo, CA (US); Steven Swihart, Walnut Creek, CA (US)

(73) Assignee: Bio-Rad Laboratories, Inc., Hercules, CA (US)

( * ) Notice: Subject to any disclaimer, the term of this patent is extended or adjusted under 35 U.S.C. 154(b) by 0 days.

(21) Appl. No.: 16/110,333

(22) Filed: Aug. 23, 2018

(65) Prior Publication Data

US 2019/0072490 A1     Mar. 7, 2019

Related U.S. Application Data

(60) Provisional application No. 62/553,712, filed on Sep. 1, 2017.

(51) Int. Cl.
  *G01N 21/64*   (2006.01)
  *G02B 5/02*   (2006.01)
  *G02B 21/16*   (2006.01)

(52) U.S. Cl.
  CPC ..... *G01N 21/6428* (2013.01); *G01N 21/6456* (2013.01); *G02B 5/0215* (2013.01); *G02B 5/0221* (2013.01); *G02B 5/0252* (2013.01); *G01N 2021/6439* (2013.01); *G01N 2021/6463* (2013.01); *G01N 2201/0612* (2013.01); *G01N 2201/0634* (2013.01); *G02B 5/021* (2013.01); *G02B 21/16* (2013.01)

(58) Field of Classification Search
  CPC ....... G01N 21/6428; G01N 2021/6439; G02B 5/0252
  See application file for complete search history.

(56) References Cited

U.S. PATENT DOCUMENTS

| 5,143,854 | A | 9/1992 | Pirrung et al. | |
|---|---|---|---|---|
| 7,135,667 | B2 | 11/2006 | Oldham | |
| 2006/0018355 | A1 | 1/2006 | Feitisch et al. | |
| 2006/0114553 | A1* | 6/2006 | Laudo | B01L 9/06 359/368 |
| 2008/0179539 | A1* | 7/2008 | Rasnow | G01N 21/6454 250/458.1 |

(Continued)

FOREIGN PATENT DOCUMENTS

WO    2012/015013 A1    2/2012

OTHER PUBLICATIONS

International Search Report and Written Opinion from PCT/US2018/047701 dated Dec. 26, 2018; 9 pages.

(Continued)

*Primary Examiner* — Hugh Maupin
(74) *Attorney, Agent, or Firm* — Kilpatrick Townsend and Stockton LLP

(57) ABSTRACT

Devices and methods are disclosed for the substantially uniform epi-illumination of samples such as western blots using high power lasers. The uniformity of illumination is provided by particular configurations of optical diffusers, spatial or temporal laser modalities, or numbers of lasers. The increased excitation light produced by the high power lasers can enhance fluorescence emission signal strength and reduce required imaging exposure times.

18 Claims, 7 Drawing Sheets

(56) References Cited

U.S. PATENT DOCUMENTS

| | | | | |
|---|---|---|---|---|
| 2013/0194787 A1* | 8/2013 | Geske | .................. | H01S 5/4087 |
| | | | | 362/157 |
| 2013/0223056 A1* | 8/2013 | Hillendahl | ............ | F21V 21/005 |
| | | | | 362/223 |
| 2016/0085078 A1* | 3/2016 | Ronen | ................ | G02B 21/0032 |
| | | | | 348/79 |
| 2017/0276924 A1* | 9/2017 | Chan | .................... | G02B 21/365 |

OTHER PUBLICATIONS recycledgoods.com; "Spectra Physics 2020-05 Argon ion Laser with 2560 Power Supply"; Product Catalog; Mar. 26, 2017; 5 pages.
"CSeries Imaging Systems Brochure"; Azure Biosystems; 2018; 9 pages.

\* cited by examiner

HIGH POWERED LASERS FOR WESTERN BLOTTING

CROSS-REFERENCES TO RELATED APPLICATIONS

The present application claims the benefit of U.S. Provisional Appln. No. 62/553,712 filed Sep. 1, 2017, the full disclosure which is incorporated herein by reference in its entirety for all purposes.

BACKGROUND

Electroblotting is a widely used biotechnology technique that involves applying a potential difference across a matrix in which charged analytes, such as DNA, RNA, or protein, are distributed. The potential difference causes the analytes to migrate out of the matrix and become deposited on a surface, or "blot", next to the matrix, where they are immobilized. The analytes can then be detected using fluorescence, chemiluminescence, radioactivity, or other phenomena, by probing the analytes with one or more detectable binding partners.

Various kinds of electroblotting are known and practiced in the art. When the analytes are DNA fragments, the transfer of the analytes out of a gel or other matrix and onto a blot is called Southern blotting after its originator, the British biologist Edwin M. Southern. By analogy, the transfer of RNA fragments is termed northern blotting, and the transfer of proteins or polypeptides is termed western blotting.

Fluorescence detection is a useful method for western blotting and other electroblotting applications. Proteins immobilized on a surface of a western blotting membrane are commonly labeled with fluorescent markers for specific antibody detection. The fluorescent markers can be excited from above by an excitation source, with the fluorescent markers emitting light at a slightly longer wavelength, which is detected by an imaging system.

BRIEF SUMMARY

For some fluorescence imaging applications, it is desirable that the imaging time for detection be reduced. Certain imaging procedures can require exposure times as lengthy as 5-10 minutes or more. These can include applications characterized by weak emission intensities, high background signals, or detection techniques having low sensitivities. Progress that can be made in lowering minimum exposure times can translate to faster experimentation, higher detection throughput, greater imaging equipment efficiencies, and improved data robustness. In addition, some imaging processing techniques, such as high dynamic range (HDR) methods, can become more practical and attractive to implement with faster exposure times.

One technique for reducing required imaging times is to increase the intensity of excitation via illumination with an excitation light source. For example, the use of an excitation source that can deliver 10-fold greater light intensity to fluorescent markers can be expected to reduce by 10-fold the exposure time required to achieve a particular emission response. However, increases in illumination intensities and powers can be accompanied by technical problems and challenges. For example, the use of a high power laser in imaging protocols can introduce significant illumination non-uniformities related to coherence and interference properties of laser light in general, and high power laser beams in particular.

In general, provided herein are devices and methods that are characterized by the use of high power lasers for the excitation of samples such as western blots. The inventors have discovered that through the use of particular optical diffusers, configurations of multiple lasers, or multiple spatial or temporal laser modalities, epi-illumination of samples with substantially uniform illumination from high power lasers can be achieved.

One provided epi-illuminator for a sample includes a planar platform having a sample side configured to support the sample, and an excitation light source. The excitation light source includes a laser and an optical diffuser. The optical diffuser is mounted above the planar platform and positioned between the laser and the planar platform along an optical path of the laser. The laser has a power within the range from 5 W to 500 W. The epi-illuminator further includes a sensor configured to detect fluorescence emission light emitting from the sample. The fluorescence emission light has a fluorescence emission wavelength, and the excitation light does not include excitation light having the fluorescence emission wavelength.

In some embodiments, the optical diffuser is a holographic diffuser having a diffusing half angle within the range from 3 degrees to 70 degrees. In some embodiments, the optical diffuser is a holographic diffuser having a diffusing half angle within the range from 5 degrees to 30 degrees. In some embodiments, the laser has a power within the range from 10 W to 80 W. In some embodiments, the optical diffuser is a ground glass diffuser. In some embodiments, the optical diffuser is an engineered microlens array.

In some embodiments, the laser is a semiconductor vertical-cavity surface-emitting laser (VCSEL) array. In some embodiments, the laser is an edge emitting semiconductor laser or laser array. In some embodiments, the laser has two or more spatial or longitudinal modes. In some embodiments, the excitation light has a wavelength within the range from 640 nm to 850 nm. In some embodiments the excitation light source includes two or more lasers or laser arrays, wherein each of the two or more lasers or laser arrays has a power within the range from 5 W to 500 W In some embodiments, the sample side of the planar platform has an area within the range from 10 $cm^2$ to 500 $cm^2$. In some embodiments, the sample side of the planar platform has an area within the range from 50 $cm^2$ to 200 $cm^2$. In some embodiments, the sample is a biological sample. In some embodiments, the sample is a membrane or gel. In some embodiments, the sample is a western blot.

Also provided is an epi-illuminator that includes a planar platform having a sample side configured to support the sample, and an excitation light source mounted above the planar platform. The excitation light source includes five or more lasers, and has a total power of greater than 5 W. The epi-illuminator further includes a sensor configured to detect fluorescence emission light emitting from the sample. The fluorescence emission light has a fluorescence emission wavelength, and the excitation light does not include excitation light having the fluorescence emission wavelength.

In some embodiments, the excitation light source comprises ten or more lasers. In some embodiments, each of the lasers has a power within the range from 5 W to 50 W. In some embodiments, each of the lasers has a power within the range from 10 W to 20 W. In some embodiments, the excitation light source includes 100 or more lasers, wherein each of the 100 or more lasers has a power of less than 100 mW. In some embodiments, the excitation light source is a semiconductor vertical-cavity surface-emitting laser (VCSEL) array. In some embodiments, each of the lasers is an edge emitting semiconductor laser. In some embodiments, each of the lasers has two or more spatial or longitudinal modes. In some embodiments, the excitation light has a wavelength within the range from 640 nm to 850 nm.

In some embodiments, the sample side of the planar platform has an area within the range from 10 cm$^2$ to 500 cm$^2$. In some embodiments, the sample side of the planar platform has an area within the range from 50 cm$^2$ to 200 cm$^2$. In some embodiments, the sample is a biological sample. In some embodiments, the sample is a membrane or gel. In some embodiments, the sample is a western blot.

Also provided is a method for imaging a sample. The method includes providing an epi-illuminator in accordance with an embodiment, wherein the epi-illuminator has a planar platform, an excitation light source, and a sensor. The method further includes placing the sample on the planar platform. The method further includes illuminating the sample with light produced by the excitation light source. The method further includes detecting, using the sensor, fluorescence emission light emitting from the sample.

DETAILED DESCRIPTION

I. General

Figure 1:
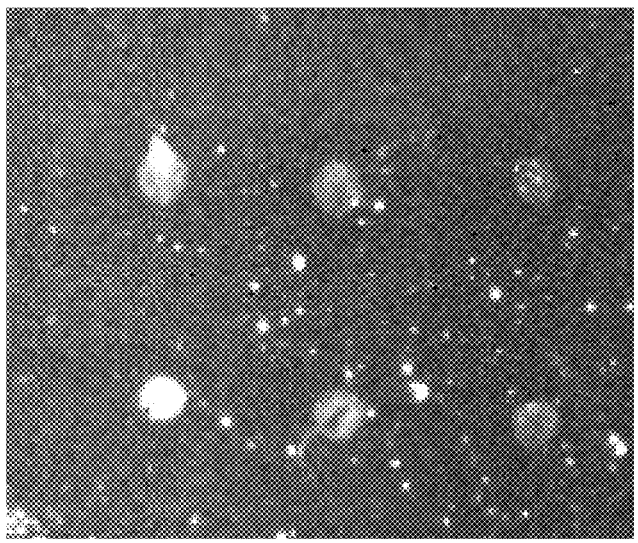
FIG. 1 is an image of a polyvinylidene fluoride (PVDF) membrane spotted with fluorescent dye illuminated by an LED light source.
Figure 2:
FIG. 2 is an image of a PVDF membrane spotted with fluorescent dye illuminated by two high power lasers and an optical diffuser.
Figure 3:
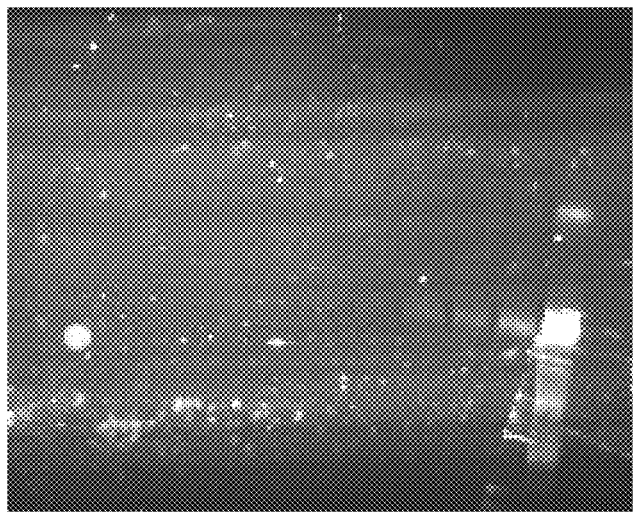
FIG. 3 is an image of a western blot illuminated by two high power lasers without an optical diffuser.

The disclosure herein generally relates to the use of high power lasers in various configurations for uniformly illuminating samples such as western blots. As used herein, the terms "high power laser" and the like are used to refer to lasers having output powers of greater than 5 W. High intensity light such as that produced by high power lasers can be used to produce excitation light capable of generating strong fluorescence emissions from fluorescent markers. In the absence of strong fluorescence emissions, detected signal intensities from fluorescent markers can be lower, and required exposure times to detect these markers can be longer. See for example FIG. 1, which shows an image of a dot blot that has been illuminated by LED lights, and FIG. 2, which shows an example of a dot blot that has been illuminated by high power lasers. It can be seen from FIG. 2 that the high power laser illumination provides high signal intensities of the dot blot spots relative to the background. Existing high power laser configurations however can fail to address interference and coherence issues with laser light that can cause significant non-uniformities in sample illumination. For example, and as shown in FIG. 3, fluorescent samples illuminated by high power lasers can exhibit visible stripe patterns unrelated to the actual sample itself. These patterns are instead caused by interference or coherence of the lasers and their related multi-modalities as described in further detail below.

The inventors have now discovered that new configurations of high power lasers can surprisingly be used to provide uniform epi-illumination of fluorescent samples. These configurations can use particular optical diffusers, numbers and positions of lasers, or combinations of selected spatial or temporal modalities. For example, FIGS. 2 and 3 present images captured with a provided high power laser configuration in accordance with an embodiment, and an alternate comparative configuration, respectively. It can be seen from FIGS. 2 and 3 that the epi-illuminator of FIG. 2 in accordance with an embodiment produces a more uniform illumination than the comparative epi-illuminator of FIG. 3 which produces an illumination characterized by horizontal banding. Beneficially, the high power laser epi-illuminators produce high emission signal intensities while reducing required imaging exposure times. In particular, the high power lasers do not negatively affect the signal to background ratios of the acquired images, and allow for the detection of fainter fluorescent features than could otherwise be accomplished.

II. Epi-Illuminators

As used herein, the term "epi-illuminator" refers to a device or system used to illuminate a sample from above or the side, for example on the same side of the sample as a sensor, such that reflected light or fluorescence emission can be detected using the sensor. This is in contrast to illumination from below the sample, or on the opposite side of the sample as the sensor, in which light passing through the sample can be detected using the sensor. The illuminating light of the epi-illuminator can be referred to as epi-illumination or episcopic illumination, and the use of fluorescence light in an epi-illuminator can be referred to as epifluorescence.

Figure 4:
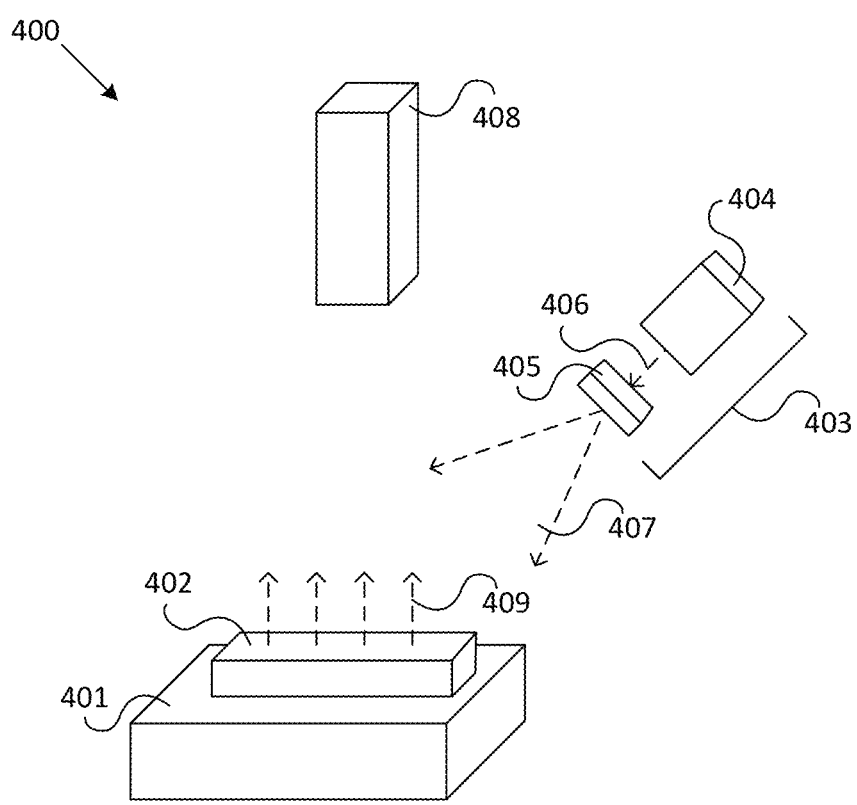
FIG. 4 is an illustration of an epi-illuminator in accordance with an embodiment.

FIG. 4 illustrates an epi-illuminator in accordance with an embodiment. The epi-illuminator 400 includes a planar platform 401 having a sample side that is configured to support a sample 402. The epi-illuminator also includes an excitation light source 403 that itself includes a laser 404 and an optical diffuser 405. In the epi-illuminator of FIG. 4, both the laser and optical diffuser are mounted above the planar platform. In preferred embodiments, at least the optical diffuser is mounted above the planar platform. The optical diffuser is positioned between the laser and the planar platform along the optical path 406 of the laser, such that laser light projected by the laser passes through the optical diffuser and illuminates the sample. The epi-illuminator also includes a sensor 408 that is configured to detect fluorescence emission light 409 emitted from the sample.

One provided approach to addressing illumination non-uniformity that can be a property of high power lasers uses an optical diffuser positioned between the laser beam and the sample to be illuminated. The optical diffuser can be, for example and without limitation, a ground glass diffuser, a TEFLON™ diffuser, a holographic diffuser, an opal glass diffuser, a greyed glass diffuser, or a fiber optic diffuser. In some embodiments, the optical diffuser is a multi-mode optical fiber.

In some embodiments, the optical diffuser is a ground glass diffuser. A ground glass diffuser is a diffuser comprising high tolerance and high quality glass that has been ground using one or more polishing blends of various grit sizes. Ground glass diffusers are particularly well suited for applications benefitting from high light transmission, and uniform diffusion across a wide range of directions.

In some embodiments, the optical diffuser is a holographic diffuser. A holographic diffuser is diffuser having engineered holographic patterns embedded on its surface material, which can be, for example, polycarbonate, polyester, or other optical polymer. The engineered surface of a holographic diffuser is in contrast to the random surface of a ground glass diffuser. Holographic diffusers can be characterized by their diffusing half angle, defined as the angle of observation at which a luminance has half the value of the luminance of diffused light at the angle of 0°, with perpendicular incidence of light. The holographic diffuser of the epi-illuminator can have a diffusing half angle within the range from 3 degrees to 70 degrees, e.g., from 3 degrees to 43 degrees, from 10 degrees to 50 degrees, from 16 degrees to 56 degrees, from 23 degrees to 63 degrees, or from 30 degrees to 70 degrees. The holographic diffuser can have a diffusing half angle within the range between 5 degrees and 30 degrees, e.g., from 5 degrees to 20 degrees, from 7.5 degrees to 22.5 degrees, from 10 degrees to 25 degrees, from 12.5 degrees to 27.5 degrees, or from 15 degrees to 30 degrees.

In some embodiments, the optical diffuser is an engineered microlens array. Such arrays include a plurality of individual microlens units, each of which is configured to have, for example, a preselected sag profile and/or location within the array. In some embodiments, the distribution of individual microlens units within the array is randomized to minimize diffraction artifacts. The engineered microlens array can comprise materials including, for example, silicon, silicon dioxide, germanium, or combinations thereof. In some embodiments, the engineered microlens array is configured such that excitation light from a side-mounted location is flattened, thereby illuminating the sample side of an epi-illuminator planar platform with substantially uniform light intensity.

Another provided approach to addressing illumination non-uniformity uses one or more specially designed lasers that can utilize multiple spatial modes. Each of the spatial modes can have a particular beam pattern that can include any number or horizontal, vertical, or curved lines; or geometric shapes such as circles, squares, rectangles, or triangles. It is noted that in some cases, and as is shown in FIG. 3, the multiple spatial modes can interfere with one another and give rise to non-uniform illumination. However, in some embodiments, the different spatial modes are specifically chosen and configured to produce a combined illumination that is spatially incoherent, thus providing substantially uniform light intensity across the illuminated surface or object.

As used herein, the term "substantially uniform light intensity" can refer to an illumination of an area wherein the illumination intensity at any point within the area differs by less than 20% from the average illumination intensity at all points of the area. For a substantially uniform illumination, the illumination intensity at any point can be, for example, 20% less than, 18% less than, 16% less than, 14% less than, 12% less than, 10% less than. 8% less than, 6% less than, 4% less than, 2% less than, identical to, 2% greater than, 4% greater than, 6% greater than, 8% greater than, 10% greater than, 12% greater than, 14% greater than, 16% greater than, 18% greater than, or 20% greater than the average illumination intensity.

Alternatively, the term "substantially uniform light intensity" can refer to an illumination of an area wherein the illumination intensity across the area has equal intensity at random locations within the area. For a substantially uniform illumination of an area, illumination intensity variations within the surface will have the appearance of white noise, with the intensity at one location within the area being uncorrelated to the intensity of any other location within the area. In some embodiments, a substantially uniform light intensity will have light intensities with a normal distribution, i.e., a Gaussian white noise. Illumination of an area with a substantially uniform distribution will not produce a visible structure (e.g., the visible stripe patterns of FIG. 3, or the mottled background of FIG. 2) unrelated to features of the area being illuminated.

Another provided approach to addressing illumination non-uniformity uses one or more specially designed lasers that can utilize multiple temporal modes. One approach for introducing multiple temporal modalities is to illuminate the planar platform with a dynamically moving high power fiber laser. The output of a fiber laser can be varied dynamically by moving the fiber periodically over time. This can have the effect of scrambling the light projected by the laser even if the laser is only outputting a single spatial mode. If the exposure time of imaging is long enough relative to the time scale of the fiber movement, then the light intensity at all locations within the illuminated area can be effectively smoothed and made substantially uniform during imaging. In some embodiments, a ground glass diffuser is used to introduce temporal diffusion by rotating the diffuser about the optical axis of the laser beam to vary the spatial pattern of scattered light over time.

Also provided are epi-illuminators that address illumination non-uniformity by including five or more high power lasers in the excitation light source. It has been found that if the number of high power lasers is increased to five or more, then the combined illumination of the lasers can provide enough spatial and temporal incoherency to produce substantially uniform light intensity across the sample side of the planar platform, even in the absence of an optical diffuser. The number of lasers in the excitation light source can be at least five, at least six, at least seven, at least eight, at least nine, at least ten, at least fifteen, at least twenty, at least twenty-five, or at least thirty. In some embodiments, the excitation light source includes ten or more lasers. In some embodiments, the excitation light source is a VCSEL array having greater than 1000 or greater than 10,000 lasers, wherein each laser of the VCSEL array has a relatively small amount of power. For example, the power of each laser of a VCSEL array can be less than 100 mW, less than 50 mW, less than 25 mW, less than 10 mW, or less than 5 mW. The multiple lasers of the excitation light source can be positioned substantially proximate to one another; in two or more clusters, groups, or other arrangements; or in various locations about the planar platform.

The planar platform of the epi-illuminator can have at least one side that is substantially planar and is configured to hold the sample. The sample side of the planar platform can have an area that is within the range from 10 cm$^2$ to 500 cm$^2$, e.g., from 10 cm$^2$ to 150 cm$^2$, from 50 cm$^2$ to 200 cm$^2$, from 100 cm$^2$ to 250 cm$^2$, from 150 cm$^2$ to 300 cm$^2$, from 200 cm$^2$ to 350 cm$^2$, from 250 cm$^2$ to 400 cm$^2$, from 300 cm$^2$ to 450 cm$^2$, or from 350 cm$^2$ to 500 cm$^2$. In terms of upper limits, the sample side of the planar platform can have an area that is less than 500 cm$^2$, less than 450 cm$^2$, less than 400 cm$^2$, less than 350 cm$^2$, less than 300 cm$^2$, less than 250 cm$^2$, less than 200 cm$^2$, less than 150 cm$^2$, less than 100 cm$^2$, or less than 50 cm$^2$, In terms of lower limits, the sample side of the planar platform can have an area that is greater than 10 cm$^2$, greater than 50 cm$^2$, greater than 100 cm$^2$, greater than 150 cm$^2$, greater than 200 cm$^2$ greater than 250 cm$^2$, greater than 350 cm$^2$, greater than 350 cm$^2$ greater than 400 cm$^2$, greater than 450 cm$^2$. The entire area of the planar platform sample side can be illuminated by the excitation light source with substantially uniform intensity.

In some embodiments, the sample is a planar sample. The planar sample can be a sample array. The sample array can be a physical matrix in which analytes derived from one or more other samples are separated and/or distributed. Some sample arrays are two-dimensional in that they contain analytes from one sample distributed over two or more dimensions, or contain analytes from multiple samples, where the analytes from each sample are distributed over one or more dimensions. Examples of sample arrays are multi-well plates, micro-titer plates, slab-shaped electrophoresis gels, DNA microarrays, membranes, and blotting membranes. In some embodiments, the sample is a western blot.

In some embodiments, the sample is a biological sample. The term "biological sample" encompasses a variety of sample types obtained from an organism. The term encompasses bodily fluids such as blood, blood components, saliva, serum, plasma, urine and other liquid samples of biological origin, solid tissue biopsy, tissue cultures, or supernatant taken from cultured cells. A biological sample can be processed prior to assay, e.g., to remove cells or cellular debris. The term encompasses samples that have been manipulated after their procurement, such as by treatment with reagents, solubilization, sedimentation, or enrichment for certain components. The analytes of a biological sample can include, for example and without limitation, proteins, nucleic acids, antibodies, antigens, enzymes, microorganisms, or organelles.

Analytes within the sample can be detected by the sensor by measuring fluorescence emissions that are inherent to the analytes, or fluorescence associate with fluorescent markers. For example, proteins and nucleic acids absorb infrared and ultraviolet radiation and can also exhibit fluorescence. Accordingly, these analytes can be detected by directing light of an appropriate wavelength on the array and measuring an interaction between the light and the analytes. For protein analytes containing tryptophan residues, fluorescence can be enhanced by contacting the analytes with any of several halo-substituted organic compounds, such as chloroform, 2,2,2-trichloroethanol, or 2,2,2-trichloroacetic acid, in the presence of UV radiation. As described in U.S. Pat. Nos. 7,569,130 and 8,007,646 and elsewhere, under such conditions a UV light-induced reaction occurs between the indole moiety of tryptophan and the halo-sub stituted organic compound, resulting in a fluorescent compound that emits at visible wavelengths.

Detection of analytes in the sample can make use of any fluorescent labels or dyes directly or indirectly linked to the analytes. Fluorescent dyes that can serve as labels include fluoresceins, rhodamines, coumarins, BODIPYs, and cyanines. Other fluorescent dyes can be used and are reviewed, for example, in Johnson and Spence (Eds.), Molecular Probes Handbook—A Guide to Fluorescent Probes and Labeling Technologies (11th ed.), Eugene, Oreg.: 2010. Fluorescent dyes can be conjugated to analytes as desired, using enzymatic addition, Click chemistry, or the Staudinger ligation, among other techniques. In addition to organic dyes, quantum dots ("Q-dots") and fluorescent polymer nanoparticles (polymer dots or "P-dots") can serve as fluorescent labels. Quantum dots having any size, color, or composition can be used, and can be prepared and conjugated to analytes as desired (methods are reviewed, for example, in Medintz et al., Nature Materials 4: 435-446, 2005). Similarly, any polymer dots, such as those described in Wu and Chiu, Angewandte Chemie 52: 3086-3109, 2013 and elsewhere, can be conjugated to analytes for detection. Fluorescence can also be imparted to analytes by attaching these analytes to fluorescent proteins such as green fluorescent protein (GFP) or yellow fluorescent protein (YFP), which can serve as labels. In recombinant expression systems, a fluorescent protein can be synthesized along with a protein analyte as part of the same polypeptide, such that the fluorescent protein and analyte are covalently tethered together and one renders the other detectable.

The excitation light source is used to illuminate the planar platform, and as a result, the sample supported thereon, with excitation light having one or more wavelengths suitable for causing fluorescence emission from the sample. For example, the excitation light can have a wavelength matching an excitation wavelength of a fluorescent marker or dye used in a western blot, gel, membrane, or microarray. The excitation light can include light of only one wavelength, light having multiple discrete wavelengths, or light having one or more spectra of wavelengths. The excitation light can have, for example, a wavelength within the range from 640 nm to 850 nm, e.g., from 640 nm to 770 nm, from 660 nm to 790 nm, from 680 nm to 810 nm, from 700 nm to 830 nm, or from 720 nm to 850 nm. The excitation light can have a wavelength within the range from 770 nm to 810 nm, e.g., from 770 nm to 790 nm, from 775 nm to 795 nm, from 780 nm to 800 nm, from 785 nm to 805 nm, or from 790 nm to 810 nm.

In some embodiments, the excitation light has a broad wavelength spectrum, such as that of visible white light, but without the particular wavelength of light associated with fluorescence emissions from the fluorescent marker of interest. For example, a filter could be used to eliminate light having the fluorescence emission wavelength from the excitation light. As another example, a dichroic mirror can be used to transmit excitation light having the fluorescence emission wavelength away from the sample and the optical path of the sensor, while reflecting excitation light having one or more other wavelengths to illuminate the sample and excite the fluorescent markers therein. Alternatively, the fluorescence emission light can include light having a range of wavelengths that does not include the wavelength of the fluorescence emission light.

In some embodiments, an optical system of one or more mirrors is used to reflect the excitation light so that the sample is illuminated from above. In these embodiments, one or both of the optical diffuser and the one or more lasers can be positioned at any location that allows the mirrors of the optical system to reflect the excitation light and illuminate the sample uniformly. In some embodiments, the optical diffuser is not mounted above the planar platform, but the excitation light transmitted is transmitted through the optical diffuser to a mirror that is mounted above the planar platform.

In some embodiments, an optical fiber is used to route the laser beam projected from the laser to the optical diffuser. In these cases, the laser or lasers need not be mounted above the planar platform, as the optical fiber serves to deliver the illumination light from above in a manner consistent with epi-illumination techniques. For example, the lasers can be position to the side of, or below, the planar platform. The lasers can be positioned in a separate enclosure or room from the planar platform. In some embodiments, the use of one or more optical fibers to transmit laser light from multiple lasers to one or more positions mounted above the planar platform enables the multiple lasers to be positioned close to, or far apart from, one another as needed. For example, multiple lasers can be spaced relatively closely together to reduce cost by allowing for the sharing of enclosures, electronics, cooling devices, or other related equipment. Alternatively, multiple lasers can be spaced relatively far apart from one another so that localized thermal loads are not exceeded, and overall cooling needs can be reduced. In either cases, the positioning of one or more optical fiber output ends can be independent from the positioning of the one or more lasers projecting into the fiber input ends. For example, through the use of optical fibers having output ends spaced at different locations about the planar platform, multiple lasers that are spaced closely together can be used to illuminate the planar platform from multiple positions that are not spaced closely together. Optical fibers can be used to allow multiple lasers that are spaced apart from one another to illuminate the planar platform from positions that are spaced closely together. In some embodiments, the use of multiple fibers allows a single high power laser to illuminate the planar platform from multiple positions simultaneously.

In some embodiments, the excitation light source of the epi-illuminator comprises only one laser. In some embodiments, the excitation light source comprises two or more lasers. Each of the one or more lasers can be, for example and without limitation, a distributed Bragg reflector laser (DBR), such as a semiconductor vertical-cavity surface-emitting lasers (VCSEL) or edge emitting semiconductor laser. A VCSEL is a type of semiconductor laser diode with laser beam emission perpendicular from an emitting surface. The laser diode of a VCSEL comprises a resonator which consists of two distributed Bragg reflector DBR mirrors parallel to a wafer surface with an active (light-emitting) region consisting of one or more active regions for the laser light generation in between. The planar DBR-mirrors of the VCSEL consist of layers with alternating high and low refractive indices. An edge emitting semiconductor laser is a type of semiconductor laser with laser beam emissions propagating in a direction along the surface of a semiconductor chip.

Each of the one or more lasers can have an output power within the range from 5 W to 500 W, e.g., from 5 W to 300 W, from 50 W to 350 W, from 100 W to 400 W, from 150 W 450 W, or from 200 W to 500 W. Each of the one or more lasers can have an output within the range from 10 W to 80 W, e.g., from 10 W to 60 W, from 15 W to 65 W, from 20 W to 70 W, from 25 W to 75 W, or from 30 W to 80 W. In terms of lower limits, each laser can have an output power of at least 5 W, at least 10 W, at least 15 W, at least 20 W, at least 25 W, at least 30 W, at least 50 W, at least 100 W, at least 150 W, at least 200 W, at least 250 W, at least 300 W, at least 350 W, at least 400 W, or at least 450 W. In some embodiments, each of the one or more lasers has an output power within the range from 5 W to 50 W. In some embodiments, each of the one or more lasers has an output within the range from 5 W to 20 W.

Any convenient imaging sensor or sensors can be included in the present devices. Examples of suitable imaging sensors include complementary metal-oxide-semiconductor (CMOS) sensors or charge coupled device (CCD) sensors. Both CCD and CMOS sensors have two-dimensional arrays of thousands or millions of tiny cells, each of which can transforms the fluorescence emission signals from the sample into electrons. Electronic signals from the sensor can then be acquired using a control board, which can be placed, for example, adjacent to the sensor in the device, or externally. The sensor can thus be connected to the board with a cable or via a port or wireless connection. The control board can then communicate with an external device providing a user interface. The external user interface device can include a touch screen, processor, or storage device. Examples of external devices include hand-held devices (e.g. smartphones or tablets), laptop computers, and desktop computers. The external device can be accessed by cables or ports (e.g., USB or Ethernet) or by wireless signals (e.g., WiFi or Bluetooth).

In some embodiments, the imaging sensor can be cooled during exposure. Cooler temperatures can reduce dark current (a potential source of noise) in digital sensors, and enable longer exposure times, which can increase sensitivity. The sensor can be equipped with an appropriate emission filter so as to only detect those wavelengths relevant to the emitted fluorescence signals of interest.

III. Methods of Imaging a Sample

Also provided are methods of imaging a sample with any of the provided high power laser epi-illuminators. The methods include providing the epi-illuminator and a sample, and placing the sample on the planar platform of the epi-illuminator. The sample can be as described above and can be, for example, a gel (i.e., an electrophoresis gel), a membrane (i.e., an electroblotting membrane), or a western blot. The method further includes illuminating the sample with light produced by the excitation light source of the epi-illuminator, and detecting, using the sensor, fluorescence emission light emitting from the sample.

In some embodiments, the image of the sample is obtained at the same time the sample is exposed to the excitation light source. This can be done when the image is formed from light fluorescently re-emitted from the analytes upon excitation. Simultaneous imaging and exposure to excitation light can be necessary when the fluorescence lifetimes of analytes in the sample are short, on the order of milliseconds or less. Such lifetimes make it impractical to acquire an image after the light source has been turned off.

In some embodiments, the image of the sample is obtained using time-resolved fluorescence techniques. For example, the image can be acquired using fluorophores with long-lived excited states, pulsed lasers with optical gating, fast-detection electronics, and/or an imaging sensor with nanosecond or picosecond time resolution. In these embodiments, an image can be formed from light fluorescently emitted from the sample after the excitation light source has been turned off.

The acquisition of the image by the sensor and any connected computer hardware or software can include selecting an exposure time and binning suitable for producing the desired signal intensity, signal selectivity, signal to noise ratio, image resolution, or imaging time. The exposure time can be, for example and without limitation, less than 60 seconds, less than 50 seconds, less than 40 seconds, less than 30 seconds, less than 20 seconds, less than 15 seconds, less than 10 seconds, less than 5 seconds, less than 4 seconds, less than 3 seconds, less than 2 seconds, or less than 1 second. The binning, or process of combining data from adjacent sensor pixels to form a single larger pixel, can be set at, for example and without limitation, 2×2, 3×3, 4×4, 6×6, 8×8, or 10×10.

The provided methods can include any image processing steps such as applying image-sharpening algorithms to images obtained using the sensor. These algorithms can compensate, in whole or in part, for reduced spatial resolution in the images, an image received from a misplaced or non-ideal location on a sensor, a miscalibrated sample or sensor, or blurring. Standard image-sharpening algorithms can be used, such as deconvolution with an Airy disc point-spread function. Other image processing steps can include, for example, flat field correction and other normalization techniques.

IV. Examples

The present invention will be better understood in view of the following non-limiting examples.

Example 1. Effect of Optical Diffusion on High Power Laser Epi-Illumination

Figure 5A:
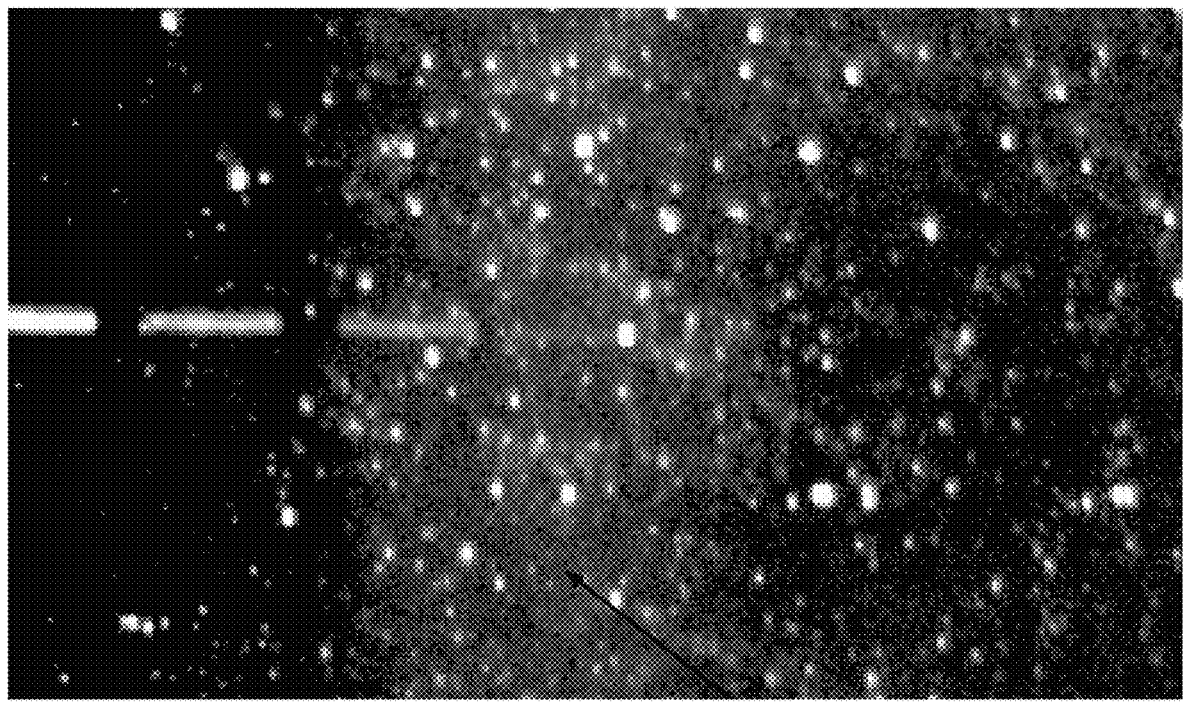
FIG. 5A is an image of a western blot illuminated by a bar laser that includes 19 individual lasers.
Figure 5B:
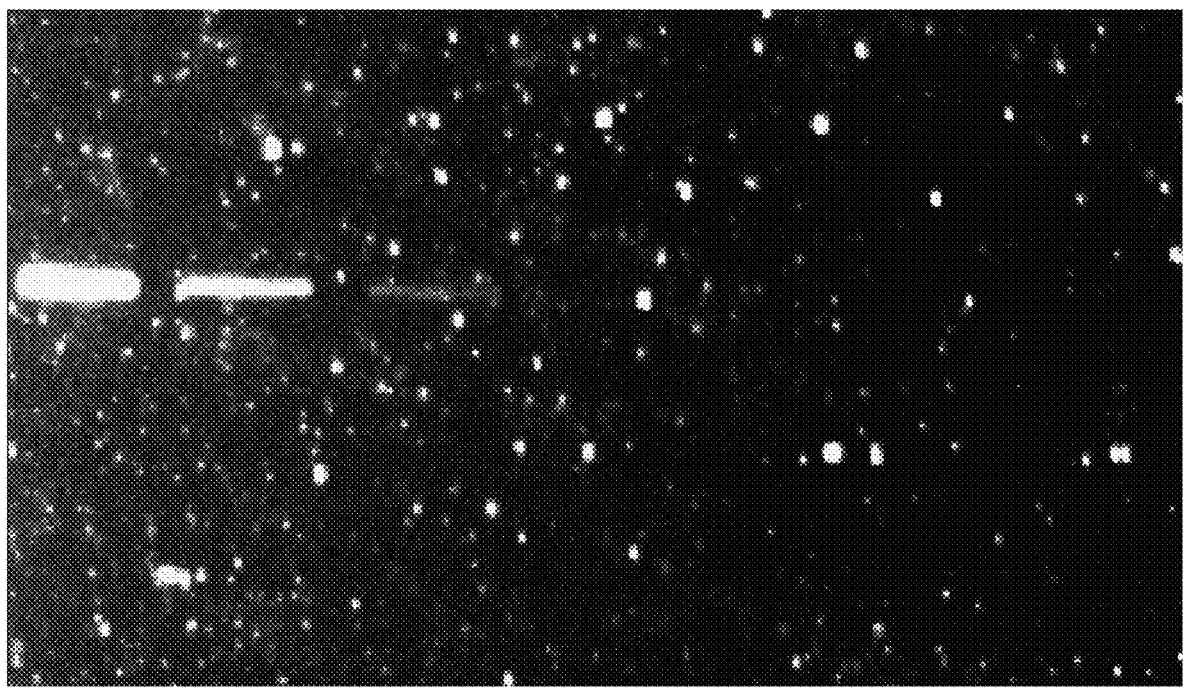
FIG. 5B is an image of the western blot of FIG. 5A illuminated by a bar laser that includes 19 individual lasers and an optical diffuser.

A blot was imaged using a bar laser having a 1×19 array of edge emitting lasers with low-noise multi-mode technology. The resulting image shown in in FIG. 5A is characterized by a generally strong signal from each of the bands of the blot, and a generally low background. However, a broad vertical stripe can be seen in the center of the image, indicating a non-uniform illumination of the blot sample due to interference of the laser beam. The blot was then imaged with the same laser using an epi-illuminator with an optical diffuser. From the image shown in FIG. 5B, it can be seen that the optical diffuser successfully "smoothed" the laser beam, reducing or eliminating the non-uniformity, without negatively impacting the strength of the desired signal detection.

Figure 6A:
FIG. 6A is an image of a blot illuminated by an LED light source, wherein the image was acquired with an exposure time of 10 seconds and a binning level of 2×2.
Figure 6B:
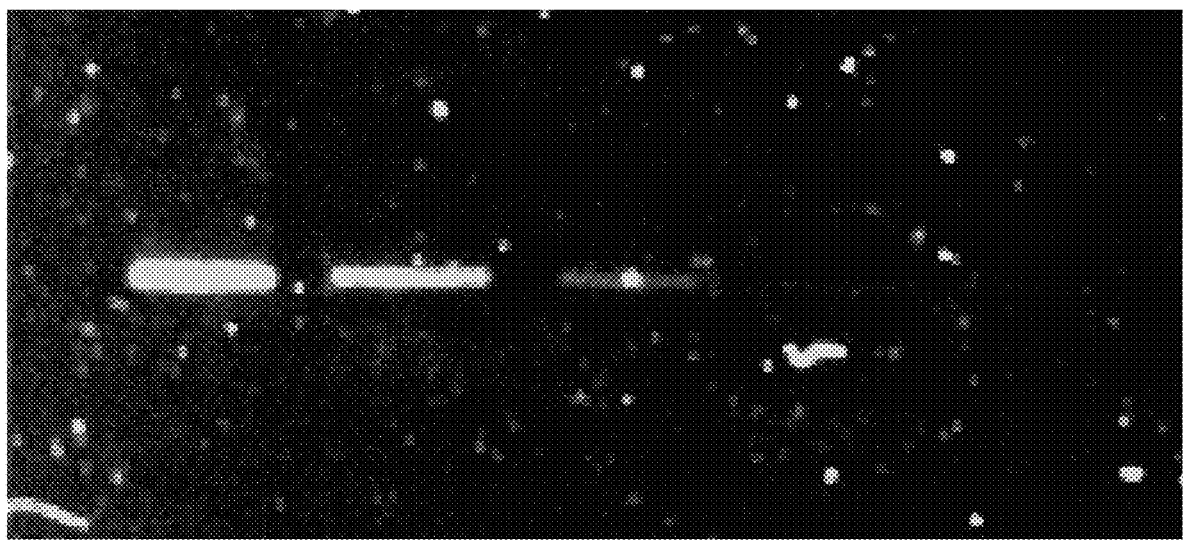
FIG. 6B is an image of the blot of FIG. 6A illuminated by a high power laser and a fused silica optical diffuser, wherein the image was acquired with an exposure time of 10 seconds and a binning level of 2×2.

Example 2. Comparison of LED and High Power Laser Epi-Illumination with a Fused Silica Diffuser A western blot was imaged using LED illumination. The image was acquired and processed using an exposure time of 10 seconds and 2×2 binning. The resulting FIG. 6A image shows one clearly visible horizontal band in the blot, and one faintly visible horizontal band. The signal intensity value calculated by the Bio-Rad ImageLab image processing software for the band was 12,175. The blot was then imaged with the same image acquisition and processing parameters, but with a high power laser and a fused silica diffuser used in place of the LED illumination. The resulting image presented in FIG. 6B shows two clearly visible bands, along with one faintly visible band, in the blot. Therefore, the switch from LED illumination to high power laser illumination allowed the band that was faintly visible with LED light to be more clearly viewed and analyzed with high power laser light. Additionally, a new band that was not detected with the LED light was also made visible with the high power laser light. The signal intensity value calculated by the image processing software for the bands of FIG. 6B was 438,621, representing a 36-fold improvement over the intensity achieved with conventional LED epi-illumination.

Figure 6C:
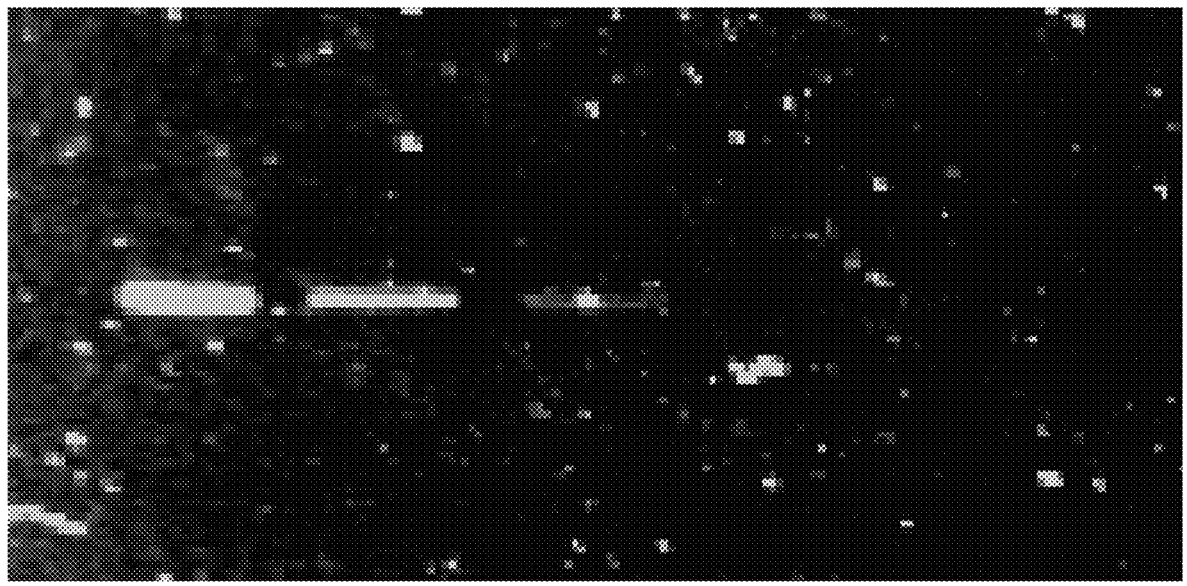
FIG. 6C is an image of the blot of 6A illuminated by an LED light source, wherein the image was acquired with an exposure time of 30 seconds and a binning level of 4×4.
Figure 6D:
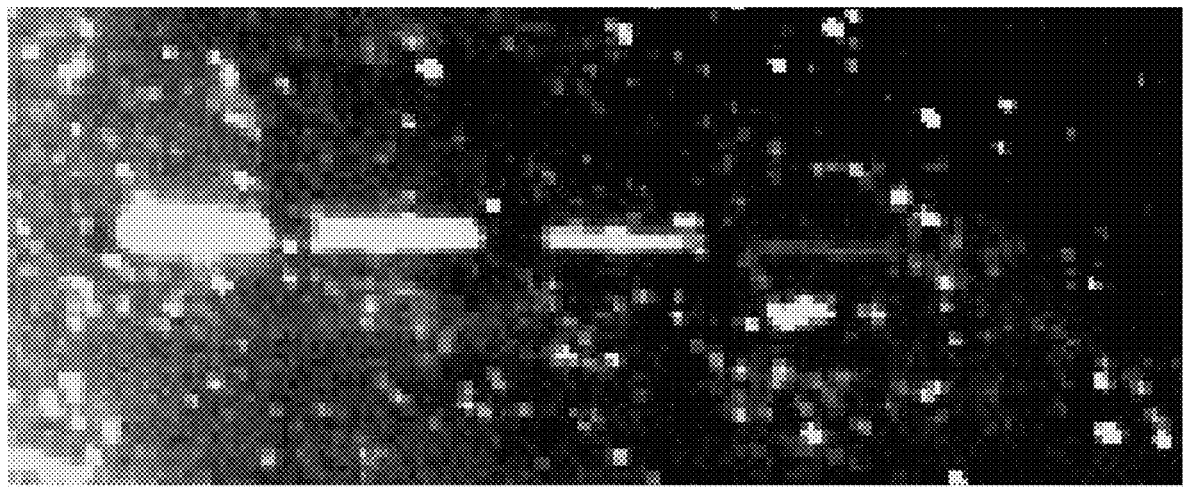
FIG. 6D is an image of the blot of FIG. 6A illuminated by a high power laser and a fused silica optical diffuser, wherein the image was acquired with an exposure time of 30 seconds and a binning level of 4×4.

The western blot was next imaged using LED illumination, but with an exposure time of 30 seconds and 4×4 binning. From FIG. 6C, it can be seen that the increased exposure time and image data binning allowed the LED illumination configuration to detect the third blot band that was not visible in the LED image of FIG. 6A, but was visible in the high power laser image of FIG. 6B. However, a comparison of FIGS. 6B and 6C shows that the exposure time for the LED illumination needed to be tripled to detect the same number of bands that could otherwise be detected with high power laser illumination. Furthermore, when a high power laser is used in place of the LED illumination, but with the same increased 30 second exposure time and 4×4 binning, the signal intensities of the bands increases still more. As shown in FIG. 6D, with this imaging configuration a fourth band becomes visible in the blot image. The signal intensity values calculated by the image processing software for FIGS. 6C and 6D were 56,465 and 1,653,472, respectively, representing a 29-fold improvement by replacing the LED epi-illumination with high power laser epi-illumination.

Figure 7A:
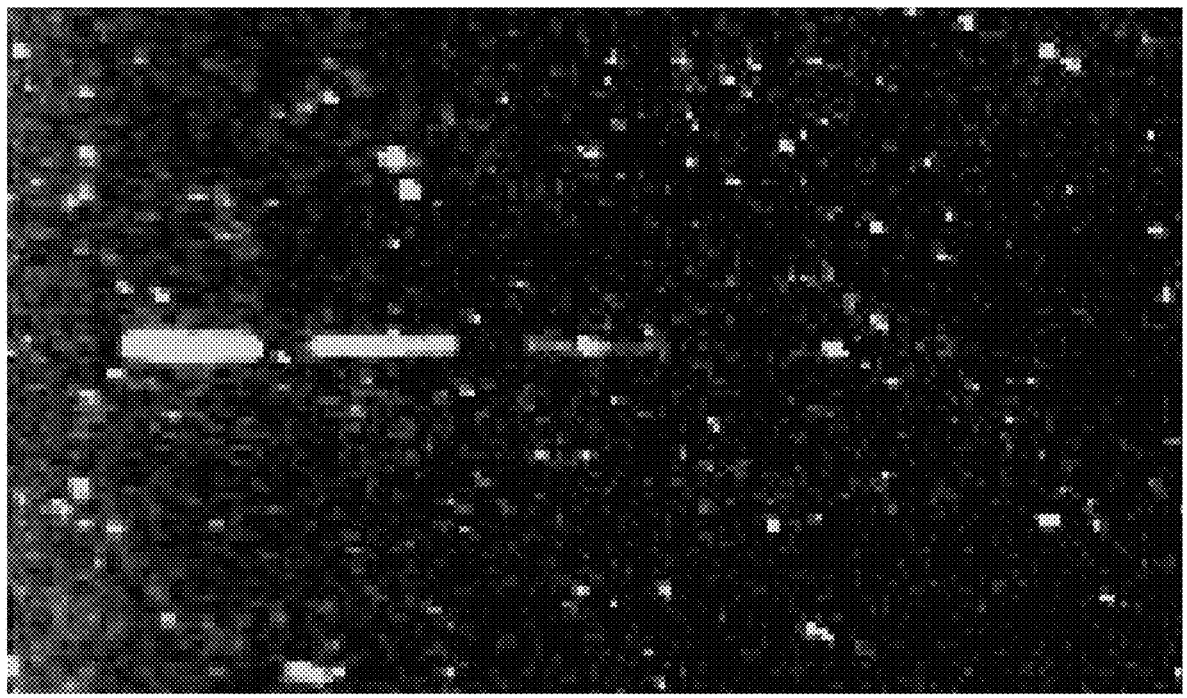
FIG. 7A is an image of a blot illuminated by an LED light source, wherein the image was acquired with an exposure time of 15 seconds and a binning level of 4×4.
Figure 7B:
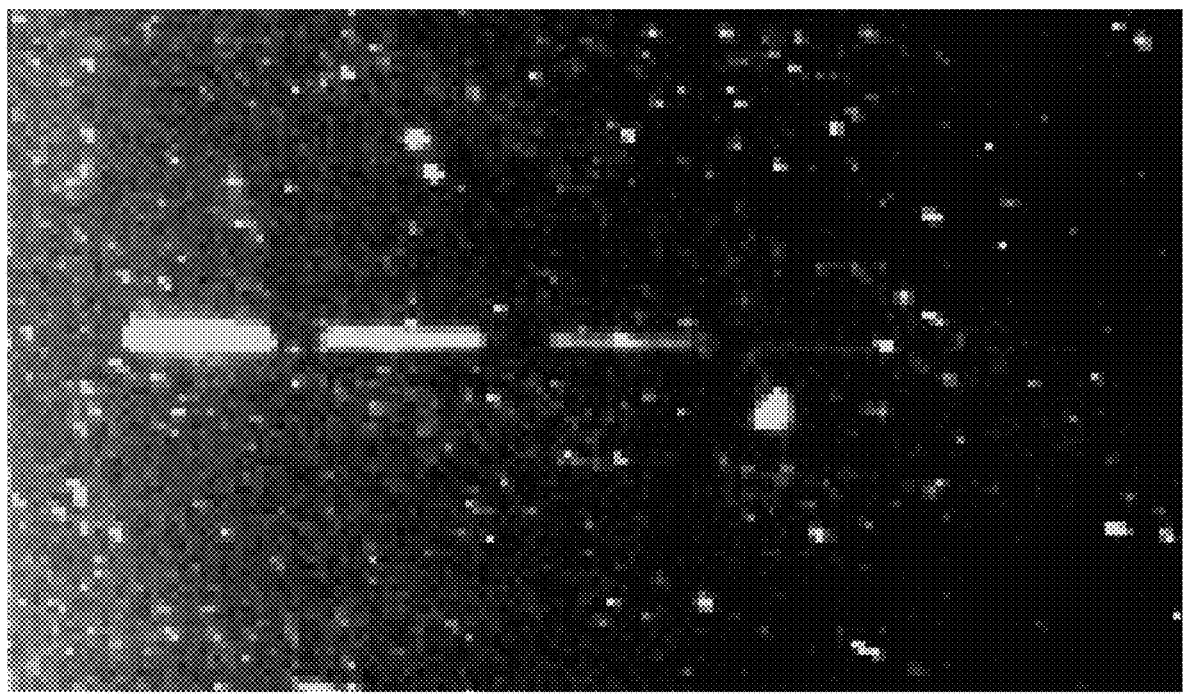
FIG. 7B is an image of the blot of FIG. 7A illuminated by a high power laser and a holographic diffuser having a diffusing half angle of 50 degrees, wherein the image was acquired with an exposure time of 15 seconds and a binning level of 4×4.

Example 3. Comparison of LED and High Power Laser Epi-Illumination with a 50-Degree Holographic Diffuser A western blot was imaged using LED illumination of the blot. The resulting image, shown in FIG. 7A, was acquired and processed using an exposure time of 15 seconds and 4×4 binning. The blot was also imaged using high power laser illumination, a holographic diffuser having a 50-degree diffusing half angle, and the same image acquisition and processing parameters. The resulting high power laser image is shown in FIG. 7B, demonstrating that no undesired interference effects are introduced with the use of the holographic diffuser. Also, the signal intensity values calculated by the image processing software for FIGS. 7A and 7B were 22,885 and 308,792, respectively, representing a 13-fold improvement by replacing the LED epi-illumination with high power laser epi-illumination.

Figure 8A:
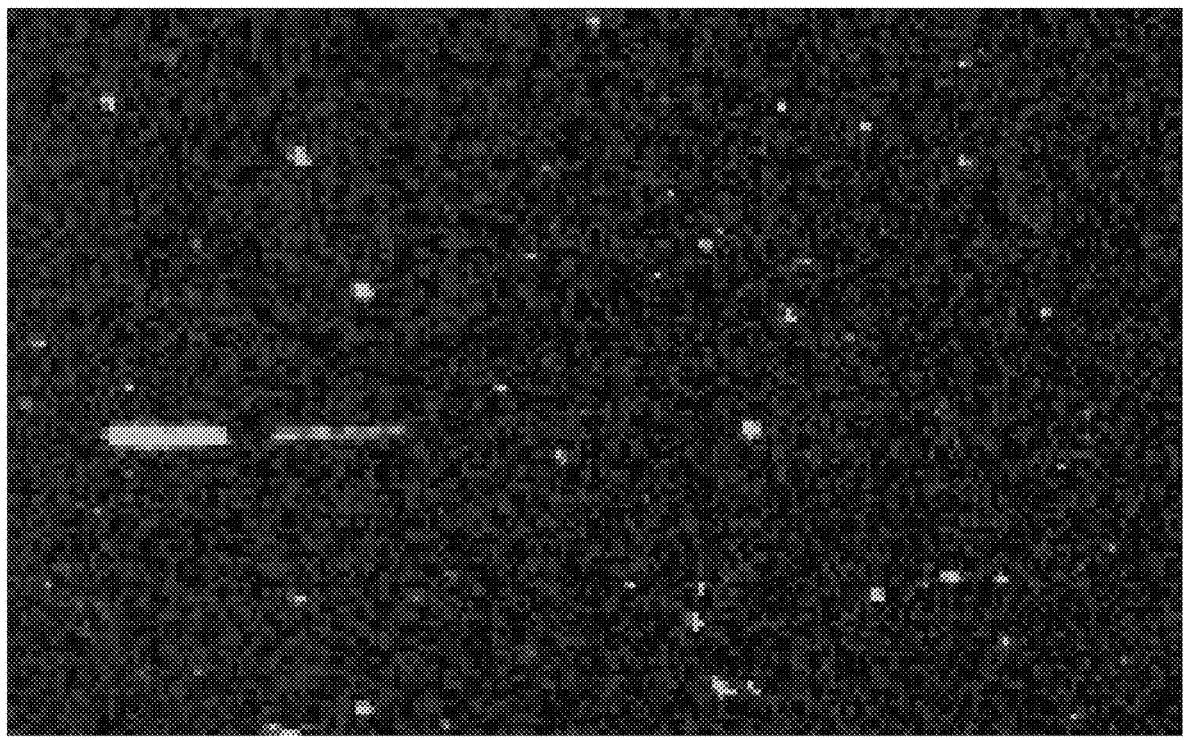
FIG. 8A is an image of a blot illuminated by an LED light source, wherein the image was acquired with an exposure time of 5 seconds and a binning level of 4×4.
Figure 8B:
FIG. 8B is an image of the blot of FIG. 8A illuminated by a high power laser and a holographic diffuser having a diffusing half angle of 20 degrees, wherein the image was acquired with an exposure time of 5 seconds and a binning level of 4×4.

Example 4. Comparison of LED and High Power Laser Epi-Illumination with a 20-Degree Holographic Diffuser A western blot was imaged using LED illumination of the blot. The resulting image, shown in FIG. 8A, was acquired and processed using an exposure time of 5 seconds and 4×4 binning. From FIG. 8A, one clearly visible band and one faintly visible band are detected in the blot. Also, a significant degree of background noise can be seen in the image at least partly as a result of the short exposure time. The blot was also imaged using high power laser illumination, a holographic diffuser having a 20-degree diffusing half angle, and the same image acquisition and processing parameters. The resulting high power laser image is shown in FIG. 8B, demonstrating a much lower level of background noise than seen with the LED illuminated of FIG. 8A. Also, the signal intensity values calculated by the image processing software for FIGS. 8A and 8B were 16,978 and 1,218,723, respectively, representing a 72-fold improvement by replacing the LED epi-illumination with high power laser epi-illumination. Because of this large improvement in signal strength, the faint second band of FIG. 8A is much more pronounced in FIG. 8B, and an additional third band not visible with the LED epi-illumination of FIG. 8A is detected with the high power laser epi-illumination of FIG. 8B. Moreover, when a holographic diffuser having a 20-degree diffusing half angle was used with high power laser epi-illumination, the configuration produced double the signal intensity of an epi-illumination system that used the high power laser but with a fused silica optical diffuser.

Systems that incorporate the apparatus are also provided. Systems can include, for example, computer systems, cooling systems, optical systems of lenses and mirrors, power supplies, power regulators, and other elements enabling the operation of the apparatus. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications, websites, and databases cited herein are hereby incorporated by reference in their entireties for all purposes. Where a conflict exists between the instant application and a reference provided herein, the instant application shall dominate.

What is claimed is:

1. An epi-illuminator for a sample, the epi-illuminator comprising:
    a planar platform having a sample side configured to support the sample, wherein the sample side has an area within the range from 10 cm$^2$ to 500 cm$^2$;
    an excitation light source comprising a laser and an optical diffuser, wherein the excitation light source is configured to illuminate the area of the planar platform sample side with substantially uniform intensity without a collimation lens, wherein the optical diffuser is mounted above the planar platform and positioned between the laser and the planar platform along an optical path of the laser, and wherein the laser has a power within the range from 5 W to 500 W; and
    a sensor configured to detect fluorescence emission light emitting from the sample, wherein the fluorescence emission light has a fluorescence emission wavelength, and wherein the excitation light does not comprise excitation light having the fluorescence emission wavelength.

2. The epi-illuminator of claim 1, wherein the optical diffuser is a holographic diffuser having a diffusing half angle within the range from 3 degrees to 70 degrees.

3. The epi-illuminator of claim 1, wherein the optical diffuser is a ground glass diffuser or an engineered microlens array.

4. The epi-illuminator of claim 1, wherein the laser has a power within the range from 10 W to 80 W.

5. The epi-illuminator of claim 1, wherein the laser is a semiconductor vertical-cavity surface-emitting laser (VCSEL) array or an edge emitting semiconductor laser array.

6. The epi-illuminator of claim 1, wherein the laser has two or more spatial or longitudinal modes.

7. The epi-illuminator of claim 1, wherein the excitation light has a wavelength within the range from 640 nm to 850 nm.

8. The epi-illuminator of claim 1, wherein the excitation light source comprises two or more lasers or laser arrays, and wherein each of the two or more lasers or laser arrays has a power within the range from 5 W to 500 W.

9. An epi-illuminator for a sample, the epi-illuminator comprising:
    a planar platform having a sample side configured to support the sample, wherein the sample side has an area within the range from 10 cm$^2$ to 500 cm$^2$;
    an excitation light source mounted above the planar platform, wherein the excitation light source is configured to illuminate the area of the planar platform sample side with substantially uniform light intensity without a collimation lens, wherein the excitation light source comprises five or more lasers, and wherein the excitation light source has a total power of greater than 5 W; and
    a sensor configured to detect fluorescence emission light emitting from the sample, wherein the fluorescence emission light has a fluorescence emission wavelength, and wherein the excitation light does not comprise excitation light having the fluorescence emission wavelength.

10. The epi-illuminator of claim 9, wherein the excitation light source comprises ten or more lasers.

11. The epi-illuminator of claim 9, wherein the excitation light source comprises 100 or more lasers, and wherein each of the 100 or more lasers has a power of less than 100 mW.

12. The epi-illuminator of claim 9, wherein the excitation light source is a semiconductor VCSEL array or wherein each of the lasers is an edge emitting semiconductor laser.

13. The epi-illuminator of claim 9, wherein each of the lasers has a power within the range from 5 W to 50 W.

14. The epi-illuminator of claim 9, wherein each of the lasers has two or more spatial or longitudinal modes.

15. The epi-illuminator of claim 9, wherein the excitation light has a wavelength within the range from 640 nm to 850 nm.

16. A method for imaging a sample, the method comprising:
    providing an epi-illuminator comprising:
    a planar platform having a sample side configured to support the sample, wherein the sample side has an area within the range from 10 cm$^2$ to 500 cm$^2$;
    an excitation light source comprising a laser and an optical diffuser, wherein the excitation light source is configured to illuminate the area of the planar platform sample side with substantially uniform intensity without a collimation lens, wherein the optical diffuser is mounted above the planar platform and positioned between the laser and the planar platform along an optical path of the laser, and wherein the laser has a power within the range from 5 W to 500 W; and
    a sensor configured to detect fluorescence emission light emitting from the sample, wherein the fluorescence emission light has a fluorescence emission wavelength, and wherein the excitation light does not comprise excitation light having the fluorescence emission wavelength;

placing the sample on the planar platform;

illuminating the sample with light produced by the excitation light source; and detecting, using the sensor, fluorescence emission light emitting from the sample.

17. The method of claim 16, wherein the optical diffuser is a holographic diffuser having a diffusing half angle within the range from 3 degrees to 70 degrees.

18. The method of claim 16, wherein the laser has a power within the range from 10 W to 80 W.

* * * * *